(12) United States Patent
Jeong

(10) Patent No.: US 11,606,730 B2
(45) Date of Patent: Mar. 14, 2023

(54) METHOD AND APPARATUS FOR IMPROVING VOICE SERVICE QUALITY IN WIRELESS COMMUNICATION SYSTEM

(71) Applicant: Samsung Electronics Co., Ltd., Suwon-si (KR)

(72) Inventor: Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 16/947,536

(22) Filed: Aug. 5, 2020

(65) Prior Publication Data
US 2021/0045021 A1    Feb. 11, 2021

(30) Foreign Application Priority Data

| Aug. 5, 2019 | (KR) | ......................... | 10-2019-0095220 |
| Feb. 17, 2020 | (KR) | ......................... | 10-2020-0019259 |
| Feb. 21, 2020 | (KR) | ......................... | 10-2020-0021847 |
| Feb. 24, 2020 | (KR) | ......................... | 10-2020-0022522 |
| Apr. 7, 2020 | (KR) | ......................... | 10-2020-0042447 |

(51) Int. Cl.
| *H04W 36/00* | (2009.01) |
| *H04W 76/30* | (2018.01) |
| *H04W 36/14* | (2009.01) |
| *H04W 36/30* | (2009.01) |

(52) U.S. Cl.
CPC .................. *H04W 36/0033* (2013.01); *H04W 36/0022* (2013.01); *H04W 36/14* (2013.01); *H04W 36/30* (2013.01); *H04W 76/30* (2018.02)

(58) Field of Classification Search
CPC ......... H04W 36/0011; H04W 36/0027; H04W 36/0022; H04W 36/14; H04W 76/30; H04W 36/0033
See application file for complete search history.

(56) References Cited

U.S. PATENT DOCUMENTS

| 9,572,194 B2 | 2/2017 | Cho et al. |
| 2020/0275335 A1 | 8/2020 | Wu et al. |
| 2020/0389830 A1 | 12/2020 | Park et al. |

(Continued)

FOREIGN PATENT DOCUMENTS

| WO | 2012157959 A2 | 11/2012 |
| WO | 2019/095162 A1 | 5/2019 |
| WO | 2019/135581 A1 | 7/2019 |

OTHER PUBLICATIONS

Media Tek Inc., "Discuss on ATSSS and Interworking with EPS", SA WG2 Meeting #134, Jun. 24-28, 2019, S2-1907346, 3 pages.

(Continued)

*Primary Examiner* — Allahyar Kasraian

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

20 Claims, 12 Drawing Sheets

(56) References Cited

U.S. PATENT DOCUMENTS

| | | | | |
|---|---|---|---|---|
| 2020/0404609 | A1* | 12/2020 | Huang-Fu | H04W 76/16 |
| 2021/0112462 | A1* | 4/2021 | Zhu | H04W 36/14 |
| 2022/0095260 | A1* | 3/2022 | Shan | H04W 60/04 |

OTHER PUBLICATIONS

"5G; System architecture for the 5G System (5GS)(3GPP TS 23.501 version 15.5.0 Release 15)", ETSI TS 123 501 V15.5.0 (Apr. 2019), 243 pages.

LG Electronics, "EPS interworking for MA PDU", Change Request, 3GPP TSG-SA WG2 Meeting #134, Jun. 24-28, 2019, S2-1907573, 3 pages.

LG Electronics, "EPS interworking for MA PDU", Change Request, 3GPP TSG-SA WG2 Meeting #134, Jun. 24-28, 2019, S2-1907574, 5 pages.

3rd Generation Partnership Project; Technical Specification Group Services and System Aspects; System Architecture for the 5G System; Stage 2 (Release 16); 3GPP TS 23.501 V16.2.0 (Jul. 2019), 393 pages.

MediaTek Inc., "Discuss on ATSSS and Interworking with EPS", SA WG2 Meeting #134, Jun. 24-28, 2019, S2-1907346, 2 pages.

Oppo et al., "Interworking for MA PDU Session", Change Request, 3GPP TSG-SA WG2 Meeting #134, Jun. 24-28, 2019, S2-1907937, 4 pages.

European Patent Search Report dated Nov. 25, 2020 in connection with European Patent Application No. 20 18 9645, 13 pages.

International Search Report dated Oct. 27, 2020 in connection with International Patent Application No. PCT/KR2020/010338, 3 pages.

Communication pursuant to Article 94(3) EPC dated Nov. 4, 2022 in connection with European Patent Application No. 20 189 645.3, 9 pages.

* cited by examiner

METHOD AND APPARATUS FOR IMPROVING VOICE SERVICE QUALITY IN WIRELESS COMMUNICATION SYSTEM

CROSS-REFERENCE TO RELATED APPLICATIONS

This application is based on and claims priority under 35 U.S.C. 119 to Korean Patent Application No. 10-2019-0095220, filed on Aug. 5, 2019, in the Korean Intellectual Property Office, Korean Patent Application No. 10-2020-0019259, filed on Feb. 17, 2020, in the Korean Intellectual Property Office, Korean Patent Application No. 10-2020-0021847, filed on Feb. 21, 2020, in the Korean Intellectual Property Office, Korean Patent Application No. 10-2020-0022522, filed on Feb. 24, 2020, in the Korean Intellectual Property Office, and Korean Patent Application No. 10-2020-0042447, filed on Apr. 7, 2020, in the Korean Intellectual Property Office, the disclosure of which is herein incorporated by reference in their entireties.

BACKGROUND

1. Field

The disclosure relates to a method for improving service quality in a mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

Meanwhile, due to the development of various IT technologies, network equipment has evolved into a virtualized network function (NF) by applying virtualization technology, and virtualized NFs can be installed/operated in various types of clouds or data centers (DCs) because they are implemented in a software form and thus are free of physical limitations. In particular, the NF can be freely expanded/reduced (scaling) or installed/terminated according to service requirements, system capacity, and network load.

In accordance with an aspect of the disclosure, there is provided a method by a terminal in a wireless communication system, the method comprising: determining whether a multiple-access protocol data unit (MA PDU) session generated by a first access network and a second access network in a 5th-generation system (5GS) moves to an evolved packet system (EPS); transmitting a request message including a request type and session information; receiving a response message including information on a release of an MA PDU session generated by the second access network; and releasing a context related to a stored access traffic steering, switching and splitting(ATSSS), wherein the release of the MA PDU session generated by the second access network is triggered by a network entity.

In an exemplary embodiment, wherein the first access network is a 3rd generation partnership project (3GPP) access network, and wherein the second access network is a non-3rd generation partnership project (N3GPP) access network.

In an exemplary embodiment, wherein the request type is an indicator related to a handover.

In an exemplary embodiment, wherein the transmitting a request message comprise transmitting a plurality of request message according to a plurality of session identifier the session information is a plurality of session information, and wherein in case that the session information is a plurality of session information, the plurality of session information includes the plurality of session identifier the plurality of session information includes a session identifier.

In an exemplary embodiment, wherein an N26 interface for interworking between the 5GS and the EPS does not exist.

In accordance with another aspect of the disclosure, there is provided a method by a network entity in a wireless communication system, the method comprising: receiving a request message including a request type and session information when a multiple-access protocol data unit (MA PDU) session generated by a first access network and a second access network in a 5th-generation system (5GS) is determined to move to an evolved packet system (EPS); triggering a release of a MA PDU session generated by the second access network based on the request type and session information of the received request message; and transmitting a response message including information on the release of the MA PDU session, wherein a context related to a stored access traffic steering, switching and splitting(ATSSS) is released.

In accordance with another aspect of the disclosure, there is provided a terminal comprising: a transceiver capable of transmitting and receiving at least one signal; and a controller coupled to the transceiver, wherein the controller is configured to: determine whether a multiple-access protocol data unit (MA PDU) session generated by a first access network and a second access network in a 5th-generation system (5GS) moves to an evolved packet system (EPS); transmit a request message including a request type and session information; receive a response message including information on release of a MA PDU session generated by the second access network; and release a context related to a stored access traffic steering, switching and splitting (ATSSS), wherein the release of the MA PDU session generated by the second access network is triggered by a network entity.

In accordance with another aspect of the disclosure, there is provided a network entity comprising: a transceiver capable of transmitting and receiving at least one signal; and a controller coupled to the transceiver, wherein the controller is configured to: receive a request message including a request type and session information, when a multiple-access protocol data unit (MA PDU) session generated by a first access network and a second access network in a 5th generation system (5GS) is determined to move to an evolved packet system (EPS); trigger a release of a MA PDU session generated with the second access network, based on the request type and session information of the received request message; and transmit a response message including information on the release of the MA PDU session, wherein a context related to a stored access traffic steering, switching and splitting (ATSSS) is released.

The disclosure proposes a method and apparatus for improving voice service quality in a wireless communication system through various embodiments.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail with reference to the accompanying drawings. In the following description, when it is determined that a detailed description of a known function or configuration related to the disclosure may unnecessarily obscure the subject matter of the disclosure, the detailed description will be omitted. In addition, terms to be described later are terms defined in consideration of functions in the disclosure, and may vary according to a user's or operator's intention or practice. Therefore, the definition should be made based on the content throughout this specification.

Terms used to identify a connection node used in the following description, terms referring to a network entity or a network function (NF), terms referring to messages, terms referring to interfaces between network entities, terms referring to various identification information, etc. are exemplified for convenience of description. Therefore, the disclosure is not limited to the terms described below, and other terms indicating objects having equivalent technical meanings may be used.

For convenience of description below, the disclosure uses terms and names defined in 3rd-generation partnership project long-term evolution (3GPP LTE) and 5G standards. However, the disclosure is not limited to the terms and names, and may be applied to systems conforming to other standards.

Meanwhile, in describing the embodiments, while the 5G and LTE (4G) systems coexist, the focus will be on improving the quality of voice service, but the main subject matter of the disclosure can be applied to any kind of wireless communication system, and can be applied not only to voice services, but also to other types of services (video calls, gaming, chat, etc.).

A new system structure and protocol are needed to support various services of 5G, and in 3GPP it has been decided to introduce a new technology called service-based architecture (SBA). The main characteristics of the service-based infrastructure are to divide the functionalities of NFs defined in the 3GPP standard into service units in consideration of the above-mentioned virtualization technology, the introduction of the cloud environment, and expansion of web-based services, and to use the HTTP/2 protocol in implementing these services.

Figure 1:
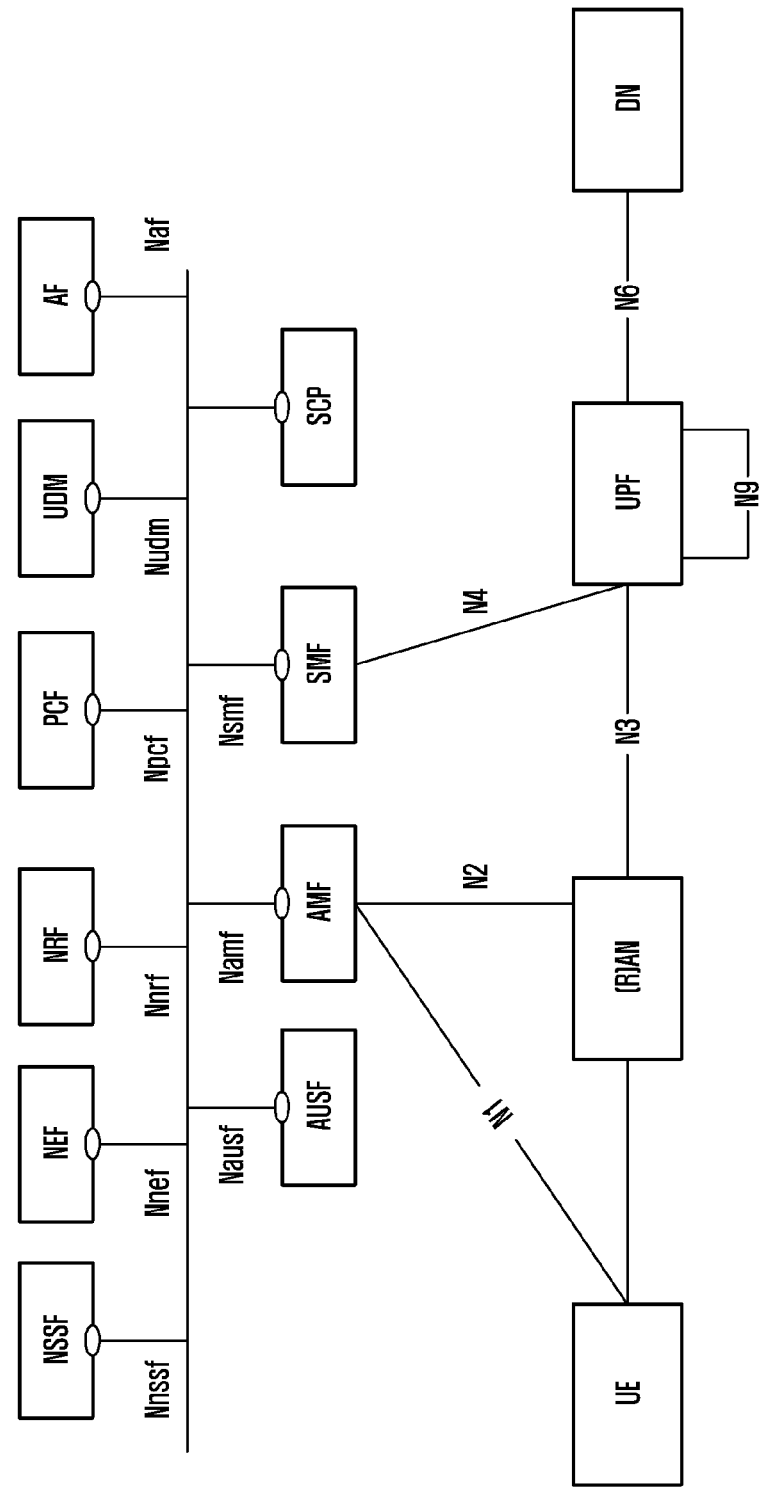
FIG. 1 is a view illustrating the structure of an SBA-based 5G system according to an embodiment.

FIG. 1 is a view illustrating the structure of an SBA-based 5G system according to an embodiment.

Referring to FIG. 1, an access and mobility management function (AMF) is a network function (NF) that manages access and mobility for a terminal (UE). A session management function (SMF) is an NF that manages a session for a UE, and the session information includes QoS information, charging information, and packet-processing information. A user plane function (UPF) is an NF that processes user plane traffic, and may be controlled by SMF. Although not shown in FIG. 1, a 5G system may include an unstructured data storage network function (UDSF), in which the UDSF is an NF that stores unstructured data and can store or retrieve any type of data at the request of another NF.

Figure 2:
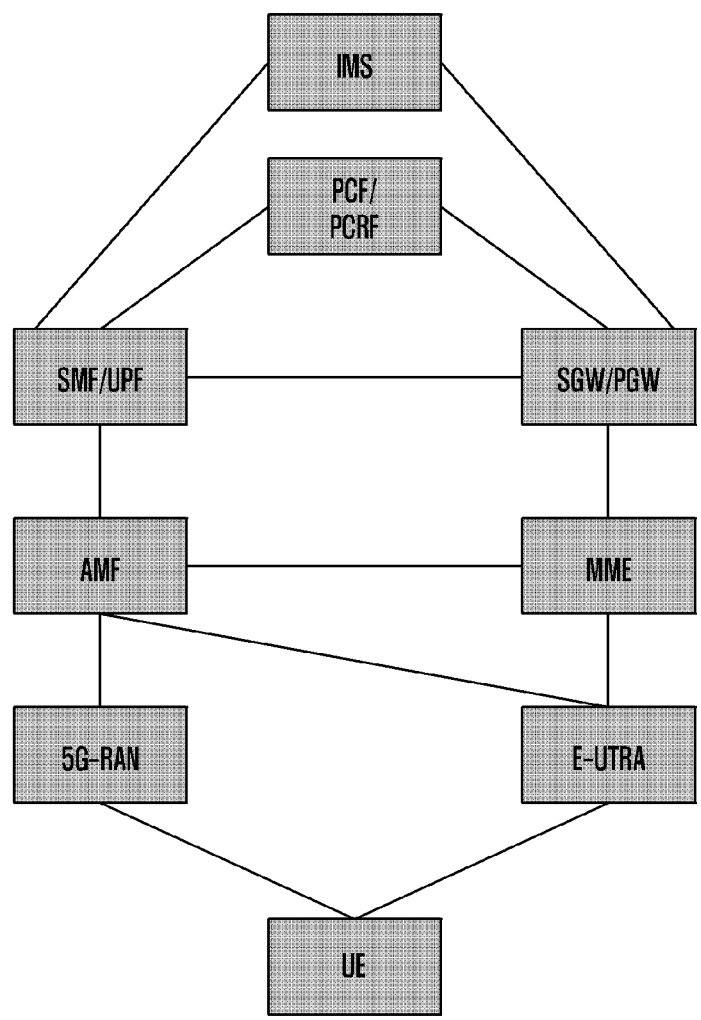
FIG. 2 is a view illustrating a network structure according to an embodiment.

FIG. 2 is a view illustrating a network structure according to an embodiment.

In describing the above drawings and embodiments, when an SGW and a packet data network gateway (PGW) are integrated for simplicity, it is assumed that a policy control and charging rules function (PCRF) and a policy control function (PCF) are integrated, but the gist and utilization of the embodiments can be applied even when the foregoing are implemented separately. In addition, in the drawing, the evolved universal terrestrial access network (E-UTRA) is displayed regardless of whether the terminal uses the evolved packet core (EPC) non-access stratum (NAS) in the E-UTRA network (i.e., when E-UTRA is connected to the mobility management entity (MME)) and the 5G core network (5GC) NAS (i.e., when E-UTRA is connected to AMF) in the E-UTRA network, but in reality, respective implementation and utilization in a separated form is possible.

Although not shown in the logical network structure, cells of 5G-RAN and 4G (E-UTRA) may overlap each other depending on the type of physical radio network construction. If 5G cell coverage is insufficient in the early stage of 5G commercialization, it may be configured to support a voice/video call service in a specific radio-access technology (RAT). In addition, depending on the operator configuration, if several types of core networks (5GC, EPC) coexist, the voice/video call service may be configured to support only a specific core network. For example, depending on the commercialization timing, the audio/video service may be configured to support only EPC, not 5GC.

If a voice/video call service is used while the terminal is registered in the network, the type of the RAT or core network to which the current terminal is connected should be changed, and the type should be transitioned to a RAT or a core network that can support voice/video call service. Such a transition may be caused by explicitly sending a command or request message to the terminal in the network, or the terminal may operate in consideration of the current state.

Figure 3:
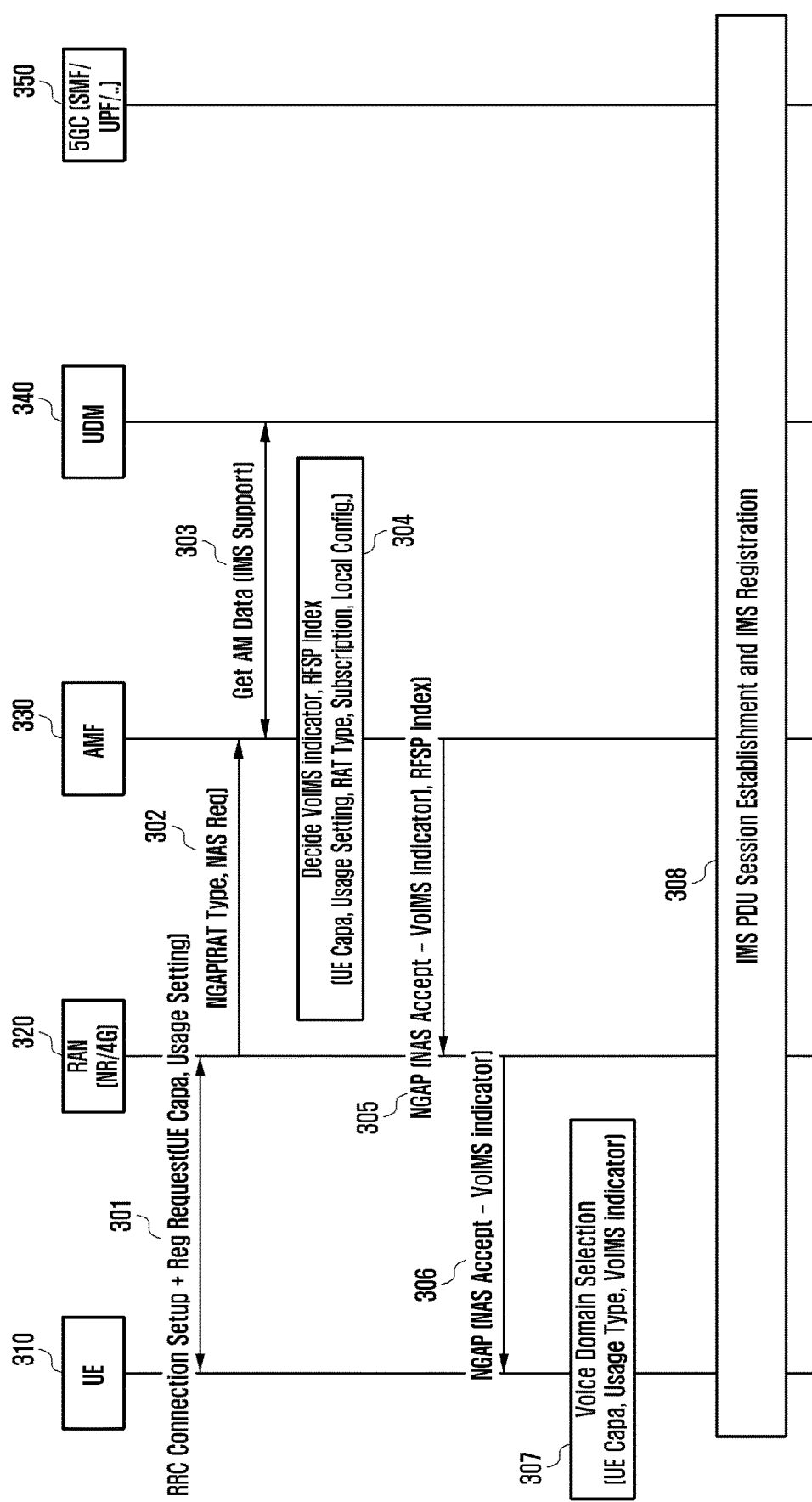
FIG. 3 is a view illustrating the operation of the terminal and the network according to an embodiment.

FIG. 3 is a view illustrating the operation of the terminal and the network according to an embodiment.

In step 301, the terminal 310 may select a system to which to connect, and requests a connection, and then may transmit a request message to register with the system. The message may include capability and usage configuration information of the terminal, and the usage configuration information may indicate whether the type of terminal requires a voice call (voice-centric).

In step 302, the base station 320 (NG-RAN, that is, 5G-RAN or E-UTRAN interworking with 5GC) may include the NAS message received from the terminal 310 in the NGAP message and send the same to the AMF 330. In this embodiment, the NAS message is a registration request, and the NGAP message may include the type of RAT (NR or E-UTRA, etc.) currently accessed by the terminal.

In step 303, the AMF 330 may process the NAS request of the terminal and may receive subscription data from a user data management (UDM) unit 340 during the registration process. The subscription information may include whether to allow the voice service for the terminal (whether the IP multimedia subsystem (IMS) service is allowed or the IMS data network name (DNN) is allowed).

In step 304, the AMF 330 may determine whether IMS voice service support is possible for the terminal 310. The AMF 330 may make the determination in consideration of the information of the terminal (capability, usage configuration, etc.) received in step 301, the RAT type currently accessed by the terminal received from NG-RAN 320 in step 302, and the subscription information received from the UDM unit 340 in step 303. In particular, if the IMS voice service is supported only in a specific RAT even when the same 5GC according to the situation of the operator network, it can be determined by comparing with the RAT type received from the NG-RAN 320. In addition, the AMF 330 may additionally perform the terminal-capability-matching process and make a decision in consideration of the results.

In addition, the AMF 330 may determine the RAT frequency selection priority (RFSP) index to be applied to the terminal. Similarly, the usage configuration transmitted by the terminal and the IMS voice over PS session support indication to be applied to the terminal can be considered. More specifically, if the usage configuration of the terminal is voice-centric, but the IMS voice service cannot be provided in the current network, the AMF 330 may induce the terminal to stay at the RAT capable of supporting voice service as long as possible using the RFSP index. On the other hand, if the usage configuration of the terminal is not voice-centric, the RFSP Index can be used to induce the terminal to stay in a wireless network (NR, etc.) capable of high-speed data transmission.

In step 305, the AMF 330 may transmit a registration acceptance message to the terminal 310. If it is determined in step 304 that support for the IMS voice service is possible for the terminal, the AMF 330 may transmit the registration acceptance message including the IMS voice over PS session supported indication. The message may be delivered from step 306 to the terminal 310 through NG-RAN 320.

In step 307, the terminal 310 may perform an operation for selecting a voice domain according to whether the IMS Voice over PS session supported indication is included in the registration acceptance message received from the AMF 330.

If it is not necessary to change the currently connected network (RAN and Core) including the indication, the terminal 310 may perform an operation for receiving a voice service with the IMS network in step 308, which may include PDU Session Establishment and IMS Registration through IMS DNN.

Figure 4:
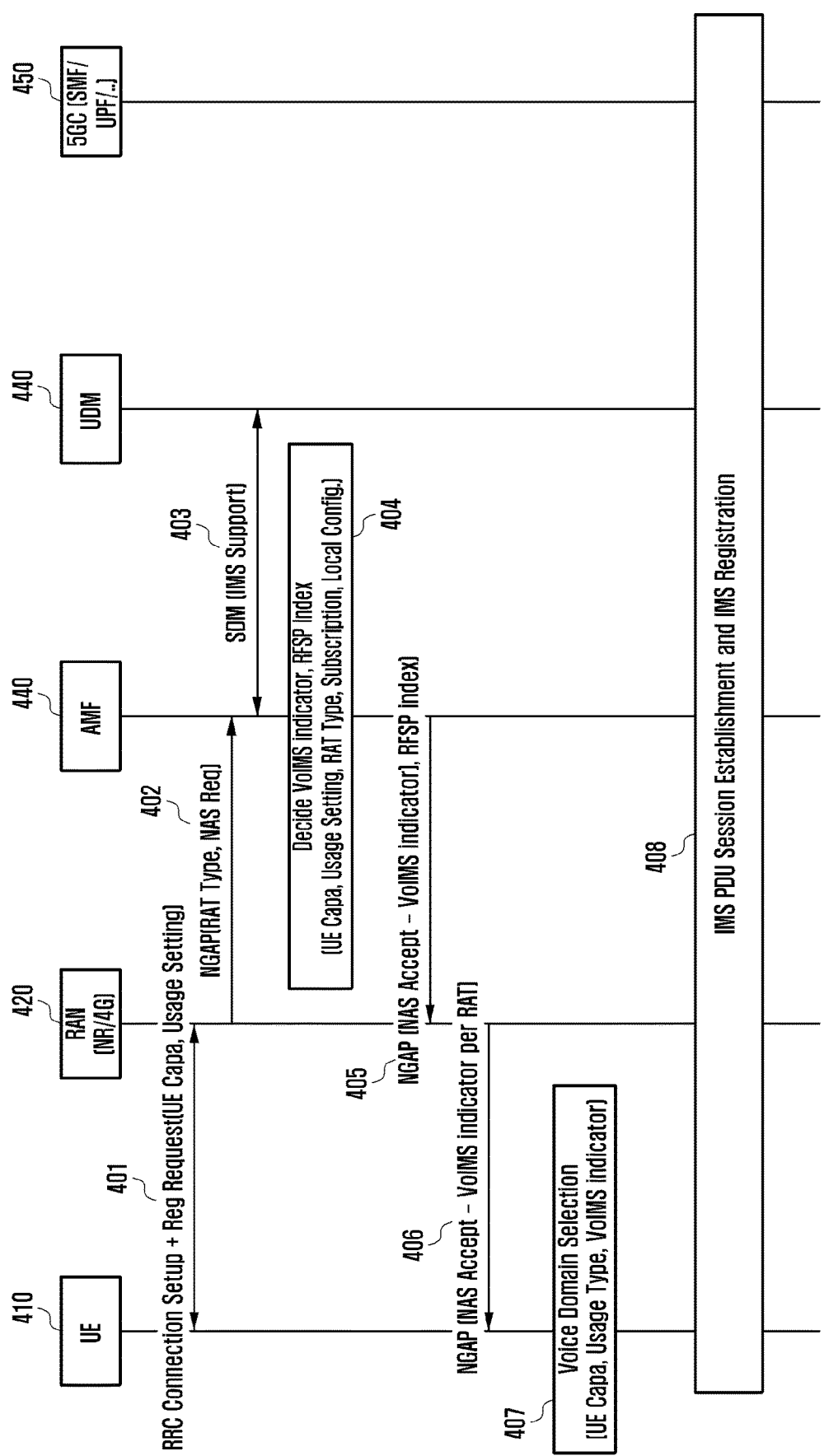
FIG. 4 is a view illustrating the operation of a terminal and a network capable of more effective operation when 5GC is combined with various types of NG-RANs (NR and E-UTRA) according to an embodiment.

FIG. 4 is a view illustrating the operation of a terminal and a network capable of more effective operation when 5GC is combined with various types of NG-RANs (NR and E-UTRA) according to an embodiment.

In step 401, the terminal 410 may select a system to access, request a connection, and then transmit a request message to register with the system. The message may include capability and usage configuration information of the terminal, and the usage configuration information may indicate whether the type of terminal requires a voice call (voice-centric).

In step 402, the base station 420 (NG-RAN, that is, 5G-RAN or E-UTRAN interworking with 5GC) may include the NAS message received from the terminal 410 in an NG application protocol (NGAP) message and deliver the same to the AMF 430. In this embodiment, the NAS message is a registration request, and the NGAP message may include the type of RAT (NR or E-UTRA, etc.) currently accessed by the terminal.

In step 403, the AMF 430 may process the NAS request of the terminal and may receive subscription data from the UDM 440 during the registration process. The subscription information may include whether to allow the voice service for the terminal (whether the IMS service is allowed and whether the IMS DNN is allowed).

In step 404, the AMF 430 may determine whether IMS voice service support is possible for the terminal. The AMF may make a decision in consideration of the terminal information received in step 401 (capability, usage configuration, etc.), and the subscription information received from the UDM 440 in step 403. In particular, if the IMS voice service is supported only in a specific RAT even when the same 5GC depending on the situation of the operator network, the AMF 430 may separately determine whether the IMS voice service is available for each RAT. In addition, the AMF 430 may additionally perform a terminal-capability-matching process and make a decision in consideration of the results.

In addition, the AMF 430 may determine the RFSP Index to be applied to the terminal. Similarly, the usage configuration transmitted by the terminal and the IMS Voice over PS Session Support Indication to be applied to the terminal can be considered. More specifically, if the usage configuration of the terminal is voice-centric but the IMS voice service cannot be provided in the current network, the AMF 430 may induce the terminal to stay at the RAT capable of supporting voice service as much as possible using the RFSP index. Conversely, if the usage configuration of the terminal is not voice-centric, the RFSP Index may be used to induce the terminal to stay in a wireless network (NR, etc.) capable of high-speed data transmission.

In step 405, the AMF 430 may transmit a registration acceptance message to the terminal. After determining whether the terminal supports IMS voice service for each RAT type in step 404, the AMF 430 may configure the IMS voice over PS session supported for the registration acceptance message for each RAT type and transmit the same. For example, if 5GC is configured to support a voice service in the operator network, but the voice service is not supported by the NR linked to the 5GC and only the E-UTRA linked to the 5GC supports voice service, the IMS voice over PS session supported may be configured to be supported for E-UTRA and may be configured not to be supported for NR, and the message may be delivered from step 406 to the terminal through NG-RAN.

In step 407, the terminal 410 may perform an operation for selecting a voice domain according to whether the IMS Voice over PS session supported indication is included in the registration acceptance message received from the AMF 430 and the currently connected RAT type.

If the indication is included and it is not necessary to change the currently connected network (RAN and Core), that is, when the IMS Voice over PS Session Supported Indication is received for the RAT type to which the terminal is currently connected, in step 408, the terminal may perform an operation for receiving a voice service through an IMS network, which may include PDU Session Establishment and IMS Registration through IMS DNN. In addition, the terminal stores the IMS Voice over PS Session Supported Indication configured for each RAT, and when the RAT accessed by the terminal changes in the future, the IMS Voice over PS Session Supported Indication should be used for voice domain selection according to the indication for the RAT.

Figure 5:
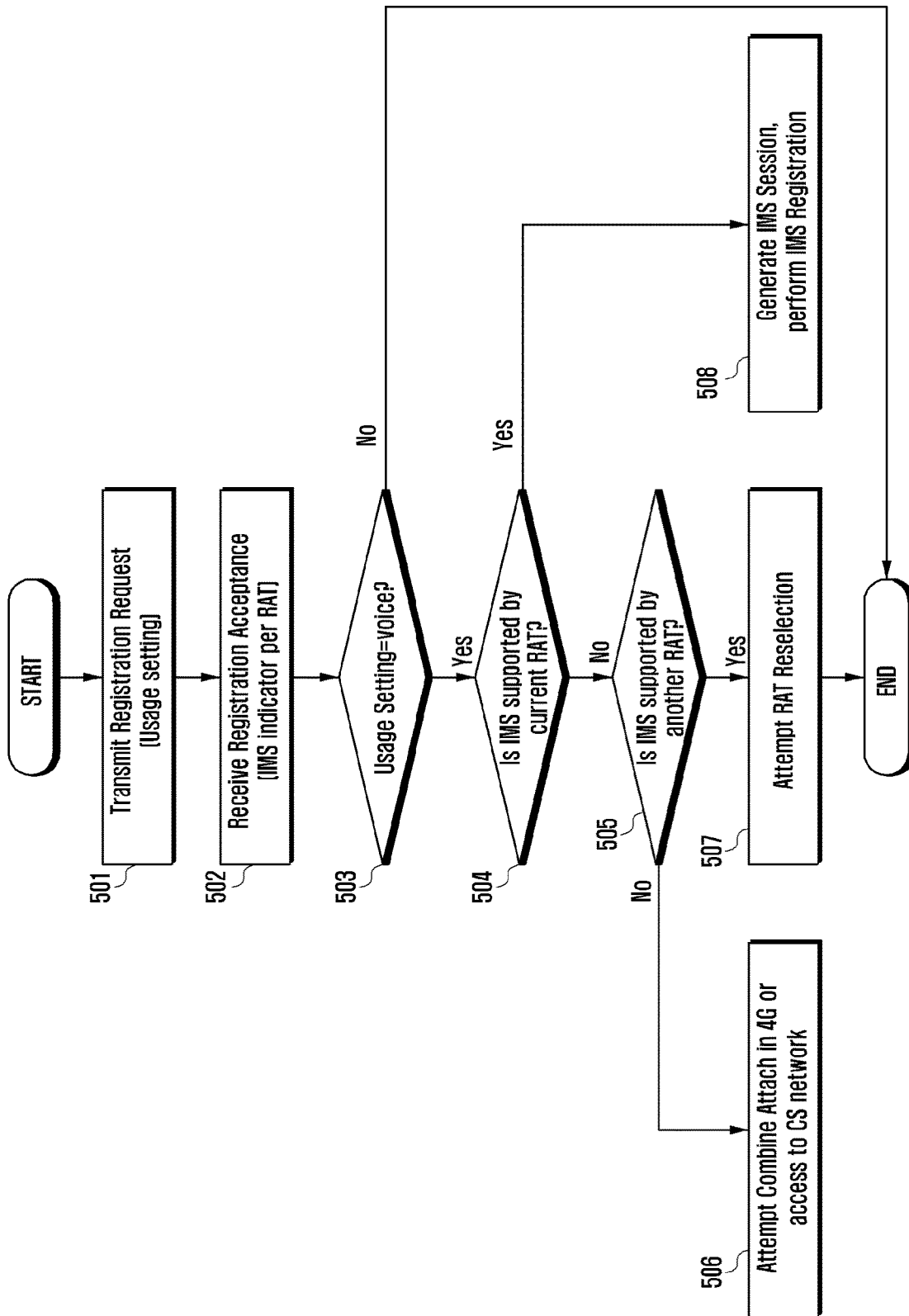
FIG. 5 is a view illustrating an operation for a terminal to select a network that provides an optimal voice service according to an embodiment.

FIG. 5 is a view illustrating an operation for a terminal to select a network that provides an optimal voice service according to an embodiment.

In step 501, the terminal may perform a registration process, and may transmit a registration request message including usage configuration configured in the terminal to the network. The usage configuration may include information indicating whether the terminal should receive a voice service.

In step 502, the terminal receives a registration response message from the network, and this message may include an IMS voice over PS session supported indication per RAT type.

In step 503, the terminal may determine whether the usage configuration is voice-centric, and if the usage configuration is voice-centric, may perform the operation of step 504, otherwise the entire process is ended.

In step 504, the terminal may determine whether the IMS voice is supported in the currently accessed RAT type, based on the information received in step 502. If the IMS voice is supported in the currently accessed RAT type, the terminal performs the operation of step 508, and may perform an operation for receiving an IMS voice service, that is, establishes a PDU Session through IMS DNN/APN and performs IMS Registration. If not, the terminal may perform the operation of step 505. In step 505, the terminal may determine whether the IMS voice is supported in another RAT type based on the information received in step 502. If the IMS voice is supported in another RAT type, the terminal may perform the operation of step 507 to perform the operation for attempting to access the RAT supporting IMS Voice. If IMS voice is not supported in another RAT type, the terminal may perform the operation of step 506 to perform another operation (combined attach or TA/LA update in 4G network or transitions to 2G/3G network) to receive a voice service.

In another embodiment of the disclosure, a method for effectively providing a voice/video call service in a network structure in which E-UTRA is linked to 5GC in an operator network is proposed. At this time, both 5GC and EPC are constructed in the operator network, and in this case, E-UTRAN becomes a network structure in a form linked to both 5GC and EPC (referring to FIG. 2). At this time, 5G-RAN using NR may exist in the operator network.

Figure 6A:
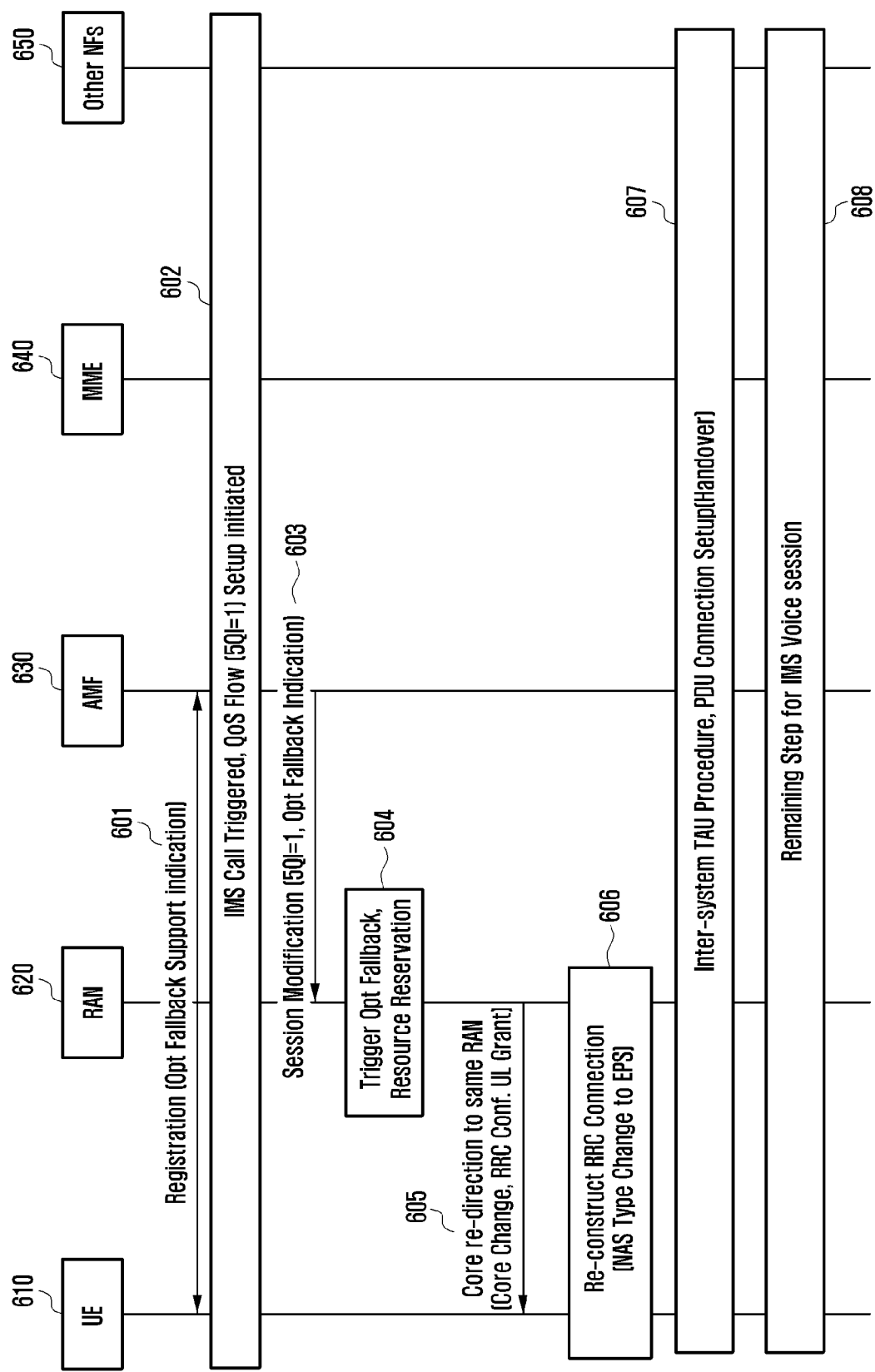
FIG. 6A is a view illustrating the operation of the terminal, the base station, and the core (5GC and EPC) according to an embodiment.

FIG. 6A is a view illustrating the operation of a terminal, a base station, and a core (5GC and EPC) according to an embodiment.

In step 601, the terminal 610 may perform a process for registration to 5GC with an AMF 630. At this time, the terminal 610 may include an indication indicating that it supports the function of this embodiment, which can effectively handle fallback for a voice (or video) call service, in a registration request message. Depending on the network structure, the AMF 630 may deliver the IMS voice over PS session supported indication and EPS Fallback support indication to the registration acceptance message sent to the terminal. Although omitted in the drawing, the terminal 610 may perform a process for generating a PDU session for the IMS DNN and registering the same with the IMS in order to use a voice (or video) call service. In addition, although omitted in the drawings, the AMF 630 may include an indication indicating that the terminal supports an additional function capable of effectively handling the fallback in the NG-AP message sent to the NG-RAN. Alternatively, the terminal 610 may include and transmit an indication indicating that it supports an additional function capable of effectively handling fallback in an RRC message to NG-RAN.

In step 602, when a voice (or video) call occurs (transmission/reception is possible), a process for an IMS voice over PS session may be processed, and during the process, the addition to the IMS Media QoS Flow (can be classified into a specific 5QI: 5QI=1, etc.) may be triggered, and the AMF 630 may inform NG-RAN 620 in step 603.

In step 604, the NG-RAN 620 (E-UTRA linked to 5GC in this embodiment) may determine that a fallback should be performed during the IMS Media QoS Flow processing process, and may start a fallback process for providing voice (or video) service of the terminal. At this time, the NG-RAN 620 may determine that the fallback process can be effectively performed based on the information received from the AMF 630 or the UE 610. At this time, in the embodiment, effectively performing the fallback process may mean, unlike existing fallback technologies, improving the quality of service by shortening the time from when the voice service is used to the time when the call is possible by utilizing the same (E-UTRA) RAT type that the terminal accesses before and after the fallback process. In step 604, the NG-RAN/E-UTRAN may perform operations to optimize the fallback process. Since the RAT types of the NG-RAN and the E-UTRAN are the same as the E-UTRA, the NG-RAN and E-UTRAN may be implemented in the form of one device, and since the protocol and information used for communication with the terminal and the AMF are different, the NG-RAN and the E-UTRAN may be constructed in separate forms. In the former case, the NG-RAN may directly generate and transmit information to be used by the terminal falling back to the E-UTRAN and transmit the same to the terminal when the cell to be accessed is not required to be changed, may shorten the separate wireless state measurement process, induce the user to change only the core type to be accessed, or select the cell of E-UTRAN to be accessed and deliver the same to the terminal in consideration of the current state and the wireless state of the terminal. In the latter case, the NG-RAN may receive information from the E_UTRAN and deliver the same to the terminal. In both cases, the information transmitted to the terminal may include information indicating that the reason for the transition of the terminal is fallback, information of a cell to be accessed by the terminal in the E-UTRAN (may be multiple cells), and parameters to be used by the terminal for initial access (part of essential information among SIB/MIB, for example, MIB and SIB ½, etc.) if a cell change is necessary. In addition, the NG-RAN may reserve the uplink resource in advance (i.e., generate an Uplink Grant) so that the terminal can transmit a message on the uplink immediately upon initial connection to the E-UTRAN, and transmit the same to the UE. If the NG-RAN and E-UTRAN are separated, the NG-RAN transmits a resource allocation request to the E-UTRAN to receive the Uplink Grant and transmit the same to the terminal.

The information generated in step 605 may be transmitted to the terminal 610, and the method used at this time may be one of RRC Connection Release or NW-Triggered Handover. If the RRC Connection Release method is used, the terminal 610 may release the RRC connection with the NG-RAN in step 606, select the cell of the E-UTRAN using the information (E-UTRAN access information generated in step 604) included in the Connection Release command message, and perform initial access. If Uplink Grant is included in the received information, an RRC connection creation message may be transmitted immediately without using a separate resource allocation request process. If the handover method is used, the terminal 610 may perform a process for handover from NG-RAN to E-UTRAN in step 606.

In step 607, the terminal 610 may perform the EPS and Inter-system Tracking Area Update process, and during this process, the context of the terminal may be transferred from 5GC to the EPC, and the terminal may be subsequently registered with the EPC to receive the service. Thereafter, the terminal and the network may perform a process for receiving the remaining voice services (step 608).

Figure 6B:
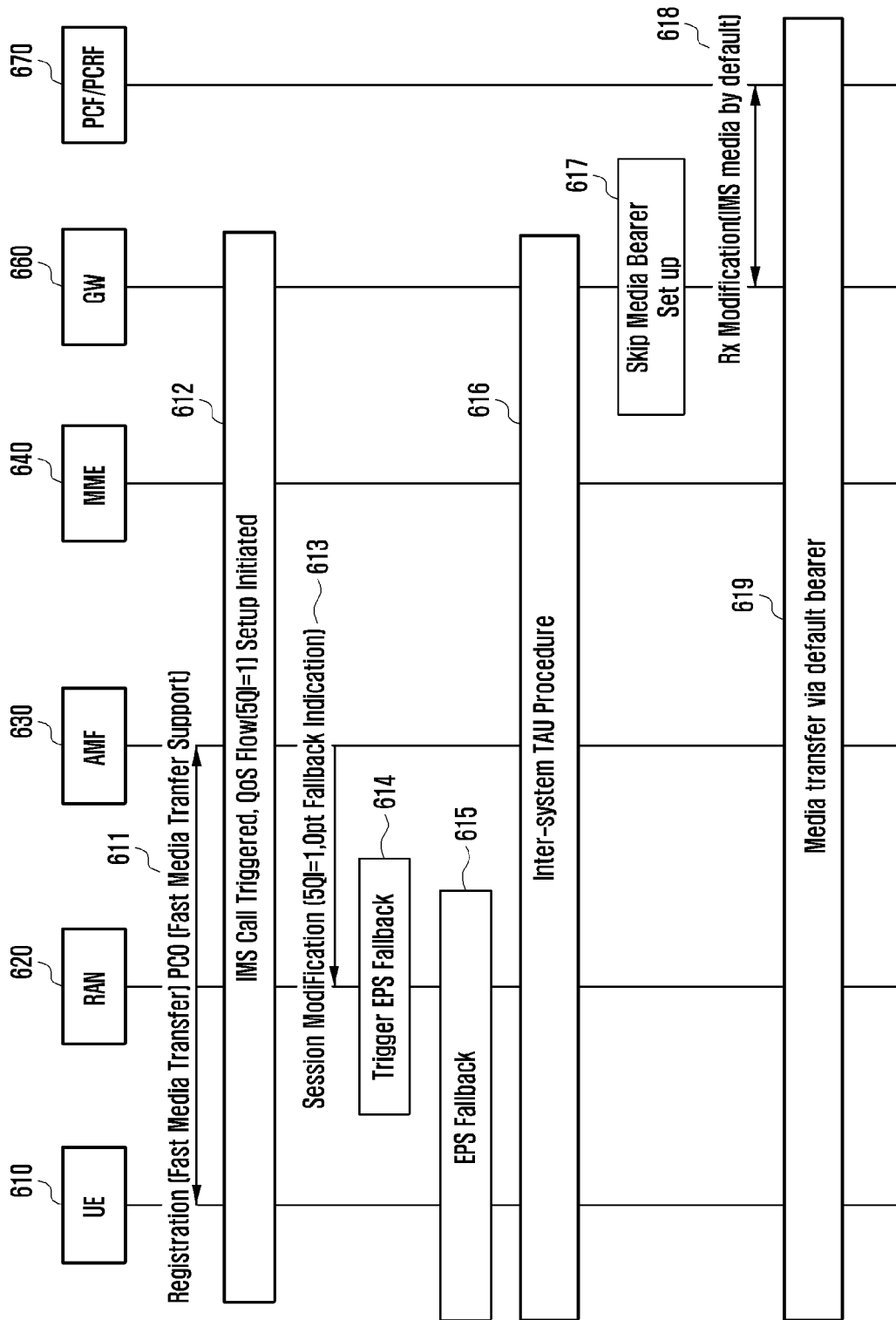
FIG. 6B is a view illustrating the operation of the terminal, the base station, and the core (5GC and EPC) according to another embodiment.

FIG. 6B is a view illustrating the operation of the terminal, the base station, the core (5GC and EPC) according to another embodiment.

In another embodiment, another method of improving quality through media flow processing when a fallback for voice (or video) call service is used is proposed. In this embodiment, the RAT type of NG-RAN linked to 5GC may be NR or E-UTRA. The main feature of this embodiment is to increase the quality of service by preventing a failure in the process of adding an EPS Bearer for IMS Media transmission in EPS (E-UTRAN+EPC) after a fallback occurs, or a situation in which the time for signaling is lengthened.

In step 611, the terminal 610 may perform a process for registration to 5GC with AMF. At this time, the terminal 610 may include an indication indicating that it supports the function of the embodiment, which can effectively process a media bearer for a voice (or video) call service, in a registration request message. Depending on the network structure, the AMF 630 may deliver the IMS voice over PS session supported indication and EPS Fallback support indication to the registration acceptance message sent to the terminal. Although omitted in the drawing, the terminal 610 may perform a process for creating a PDU session for the IMS DNN and registering the same with the IMS in order to use a voice (or video) call service. In the process of generating the PDU Session for the IMS DNN, the terminal and the SMF (+PGW-C) can inform each other that they support the function to effectively process the IMS Voice Media when a fallback occurs. The information may be directly included in the session management (SM) NAS message exchanged between the terminal 610 and the SMF (+PGW-C), or may be exchanged using a protocol configuration option (PCO).

When a voice (or video) call occurs in step 612 (both transmission/reception is possible), a process for an IMS voice over PS session may be processed, and during this process, the addition to the IMS media QoS flow (can be classified into a specific 5QI: 5QI=1, etc.) may be triggered, and the AMF 630 may provide notification thereof to the NG-RAN 620 in step 613.

In step 614, the NG-RAN (E-UTRA linked to 5GC in this embodiment) may determine that fallback should be performed during the IMS media QoS flow processing and start a fallback process for providing voice (or video) service of the UE.

In step 615, the terminal 610 may perform the EPS fallback process using the information of the message received from the NG-RAN.

In step 616, the terminal 610 may perform an inter-system tracking area update process. During this process, the default bearer of the IMS PDU session (PDN connection) may be generated.

In step 617, the EPC (GW) 660 may know that the EPS fallback process is in progress, cancel the generation of the incomplete IMS media flow that was attempted in step 612, and perform an operation to transmit and receive IMS media transmission using the default bearer of the IMS session. The operation may be applied only in the case of exchanging for supporting a function for effectively providing media processing when EPS fallback occurs between the terminal and the network in step 611, or may be applied to all terminals implicitly. In addition, this operation may be applied only when media flow generation fails (e.g., resource allocation in the base station fails) or is unsuccessful for a predetermined time. The operation may include adding a packet filter for transmitting/receiving IMS media flow between the terminal and the network to the default bearer, or configuring the packet filter of the default bearer as match-all, and GW 660 may also explicitly inform the PCF (PCRF) 670 that it uses the default bearer to provide media flow during the process (step 618).

Thereafter, in step 619, the IMS media flow is transmitted/received through the default bearer of the IMS PDN connection between the terminal and the network to enable voice calls. If an additional EPS bearer for transmitting the IMS media flow is generated thereafter, the terminal and the network allow the IMS media flow to be transmitted through the newly generated dedicated bearer. Specifically, in the IMS media flow, the priority of bearer mapping for processing is configured to be higher for the newly generated dedicated bearer than the default bearer. To this end, the process of modifying the packet filter for default/dedicated bearers of the IMS PDN connection may be performed.

Figure 7:
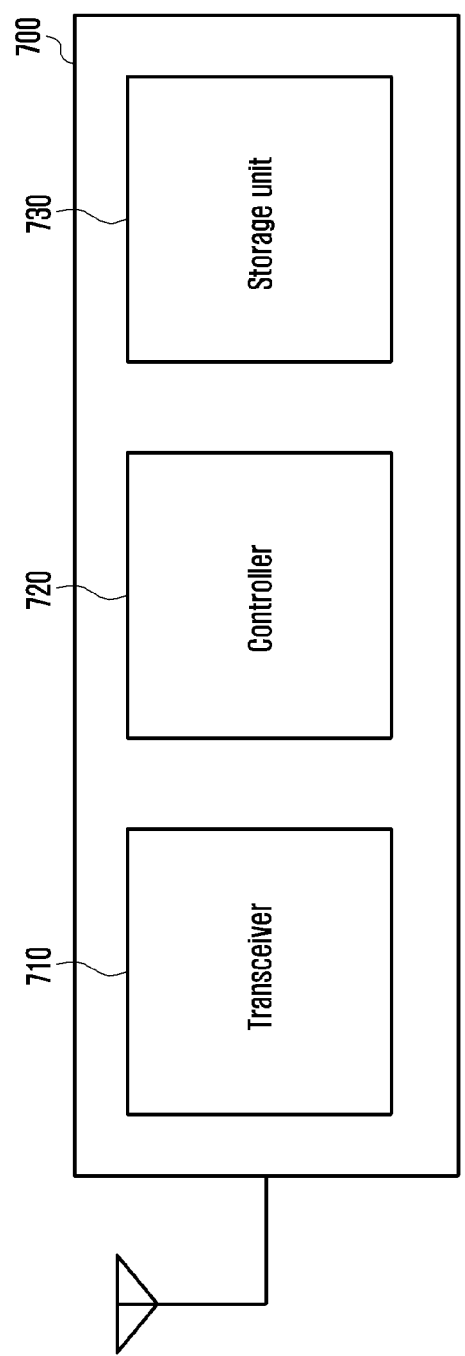
FIG. 7 is a view illustrating the configuration of a network entity according to the disclosure.

FIG. 7 is a view illustrating the configuration of a network entity according to the disclosure. Referring to FIG. 7, the network entity may include a transceiver 710, a controller 720, and a storage unit 730. The network entity of the disclosure conceptually includes a network function, which may vary depending on the system implementation.

The network entity according to an embodiment may include a transceiver 710 and a controller 720 that controls the overall operation of the network entity. In addition, the transceiver 710 may include a transmitter 711 and a receiver 712.

The transceiver 710 may transmit and receive signals with other network entities. The transceiver 710 may receive, for example, system information from a base station, and may receive a synchronization signal or a reference signal.

The controller 720 may control the network entity to perform any one of the above-described embodiments. On the other hand, the controller 720 and the transceiver 710 are not necessarily implemented as separate modules, and of course can be implemented as a single component in the form of a single chip. In addition, the controller 720 and the transceiver 710 may be electrically connected. Additionally, for example, the controller 720 may be a circuit, an application-specific circuit, or at least one processor. Further, the operations of the network entity can be realized by providing the memory device storing the corresponding program code in any component in the network entity.

The network entity may be one of a base station (RAN), AMF, SMF, UPF, NF, NEF, NRF, CF, NSSF, UDM, AF, AUSF, SCP, UDSF, context storage, OAM, EMS, configuration server, and ID management server.

The storage unit 730 may store at least one of information transmitted and received through the transceiver 710 and information generated through the controller 720. For example, the storage unit 730 may store scheduling information related to RMSI transmission, PDCCH time axis position and period information related to RMSI, and the like.

Figure 8:
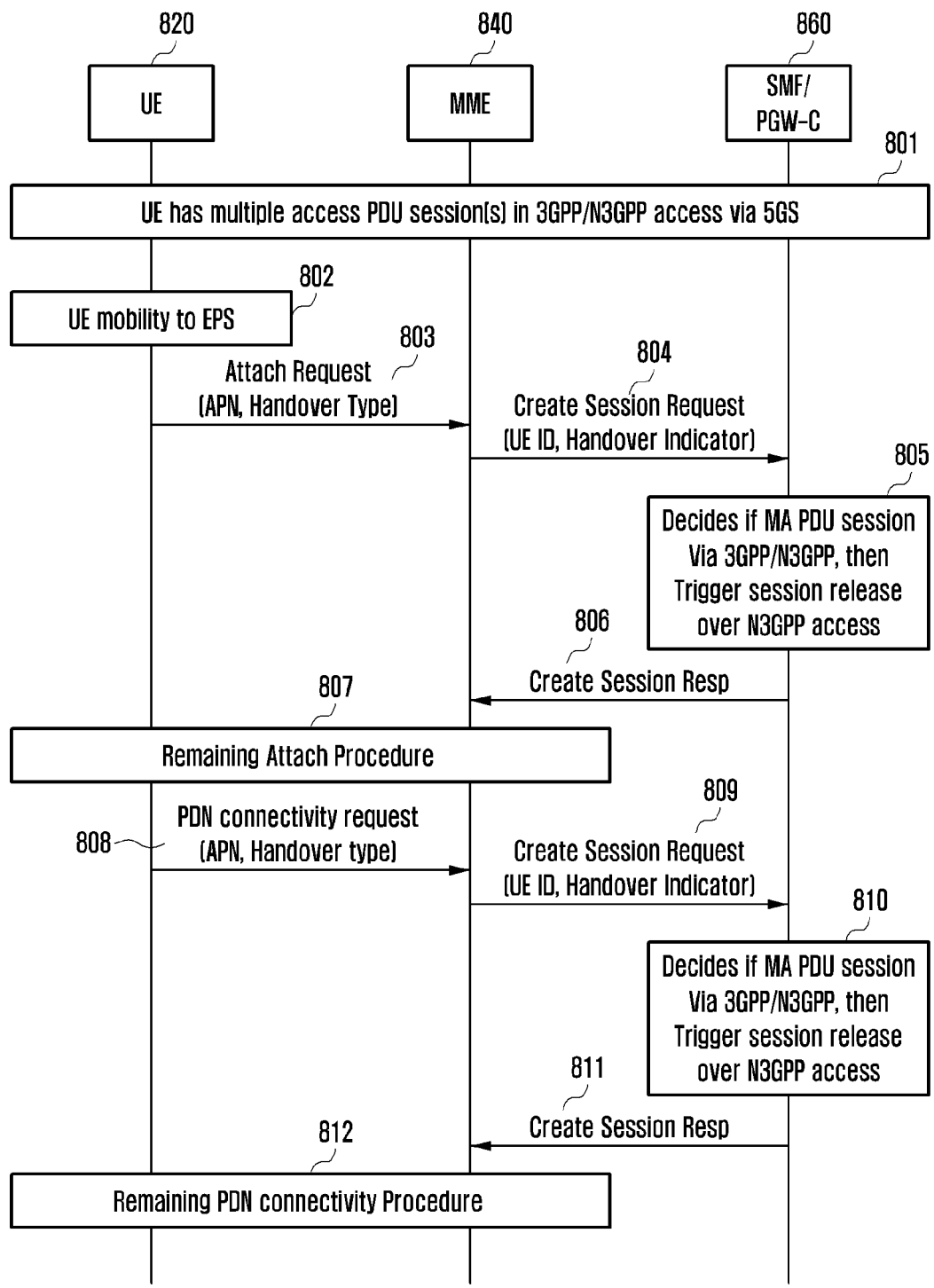
FIG. 8 is a view illustrating a flow of operations for continuously providing service by processing a session when moving between a 5G network (5GS) and a 4G network (EPS) according to another embodiment.

FIG. 8 is a view illustrating a flow of operations for continuously providing a service by processing a session when moving between a 5G network (5GS) and a 4G network (EPS) according to another embodiment. Specifically, another embodiment relates to a method of continuously providing a service by processing a session when a terminal moves between a 5G network (5GS) and a 4G network (EPS).

If the terminal 820 moves or transitions to a 4G network while receiving service by generating a multiple-access (MA) PDU session through a 3GPP wireless network and a non-3GPP (N3GPP) wireless network in a 5G network, it may be necessary to process the session and reconfigure the transmission path. This is a necessary function when the 4G network cannot support the MA PDU session through the N3GPP wireless network. In particular, this embodiment is intended for the case where there is no N26 interface to support interworking between 5GS and EPS, in which case the AMF of 5GS and the MME of EPS cannot directly exchange the terminal context. In the following detailed operation, PGW, PGW-C, and SMF may all refer to the same object. In this embodiment, the MA PDU session may be the same as an access traffic steering, switch and splitting (ATSSS) session. Alternatively, in the disclosure, PDN connection and PDU session may have the same meaning.

Step 801. The terminal 820 is registered in 5GS and may receive service by generating a multiple-access (MA) protocol data unit (PDU) session through both 3GPP and N3GPP wireless networks.

Step 802. The terminal 820 may decide to move to the 4G network (EPS) for reasons such as mobility, radio conditions, service characteristics, and network commands.

Step 803. The terminal 820 may perform an operation for attaching to the 4G network. The terminal 820 transmits an attach request message to the MME of the 4G network. At this time, the request message may include an Attach or a request type of a PDN connectivity request included in Attach, and the request type may be a handover. In addition, information of a session (APN) in which the terminal continuously receives a service by moving from 5GS to EPS during the Attach process may be included. Specifically, the terminal may additionally include the identifier of the session used in 5GS in the PCO inserted in the Attach request message.

Step 804. The MME 840 may select PGW-C+SMF 860 using PGW information (more specifically, PGW-C+SMF) among the subscription information received from the APN and HSS/UDM received from the UE, and may transmit a Create Session request message for session creation. The message may include an ID of the terminal (subscriber) indicating that the type of session creation is Handover. In addition, RAT type information indicating that the wireless network currently being accessed by the terminal is 3GPP (or 4G LTE) may be included. In this process, the process of transmitting the message by the SGW between the MME and the PGW-C+SMF is omitted.

Step 805. The PGW-C+SMF 860 may process the received session creation request. If the session creation request message includes information indicating handover, and an MA PDU session has been generated for the target terminal, the PGW-C+SMF 860 may trigger an operation to delete (release) the MA PDU session generated by the N3GPP wireless network. In particular, the PGW-C+SMF 860 may determine, using the RAT type information included in the request message, that the Handover request during the session creation is interworking in the 3GPP network (5GS and EPS) rather than handover between the 3GPP and N3GPP wireless networks.

Step 806. The PGW-C+SMF 860 may transmit a response to the session creation request.

Step 807. The rest of the Attach process may be performed. At this time, the terminal 820 may delete the stored ATSSS-related information, that is, policies or rules for ATSSS, and assistance information for measurement, etc. from the internal information (terminal context for PDN connection) for the PDN connection moved from 5GS to EPS. Likewise, for the PDN connection moved from 5GS to EPS, the stored ATSSS-related information, that is, the policy or rule for ATSSS, assistance information for measurement, etc. may be deleted from internal information (SM context or PGW context).

Step 808. If an additional PDU session remains, in addition to the PDU session that the terminal 820 handed over to the EPS during the attach process, the terminal may perform a process for handing over remaining sessions to the EPS. More specifically, the terminal 820 may send a PDN connection creation request to the MME 840, move from 5GS to EPS, include session information (APN) to receive the service without interruption, and include a handover of the type of the request being generated. In addition, the terminal may additionally include the identifier of the session used in 5GS in the PCO inserted in the request message.

Step 809. The MME 840 may select PGW-C+SMF 860 using the PGW information (more specifically, PGW-C+SMF) among the subscription information received from the APN and the HSS/UDM received from the UE, and transmit a Create Session request message for session creation. The message may include an ID of the terminal (subscriber), indicator indicating that the type of session creation is Handover. In addition, RAT type information indicating that the wireless network currently being accessed by the terminal is 3GPP (or 4G LTE) may be included. In the process, the process of transmitting the message by the SGW between the MME and the PGW-C+SMF is omitted.

Step 810. The PGW-C+SMF 860 may process the received session creation request. If the session creation request message includes information indicating handover, and an MA PDU session has been generated for the target terminal, the PGW-C+SMF 860 may trigger an operation to delete (release) the MA PDU session generated by the N3GPP wireless network. In particular, the PGW-C+SMF 860 may determine, using the RAT type information included in the request message, that the Handover request during the session creation is interworking in the 3GPP network (5GS and EPS) rather than handover between the 3GPP and N3GPP wireless networks.

Step 811. The PGW-C+SMF 860 may send a response to the session creation request.

Step 812. The rest of the PDN Connection creation process may be performed. At this time, the terminal 820 may delete the stored ATSSS-related information, that is, policies or rules for ATSSS, and Assistance information for measurement, from the internal information (terminal Context for PDN Connection) for the PDN connection moved from 5GS to EPS. Likewise, for the PDN connection moved from 5GS to EPS, SMF may also delete the stored ATSSS-related information, that is, policies or rules for ATSSS, and assistance information for measurement from internal information (SM Context or PGW Context).

Figure 9:
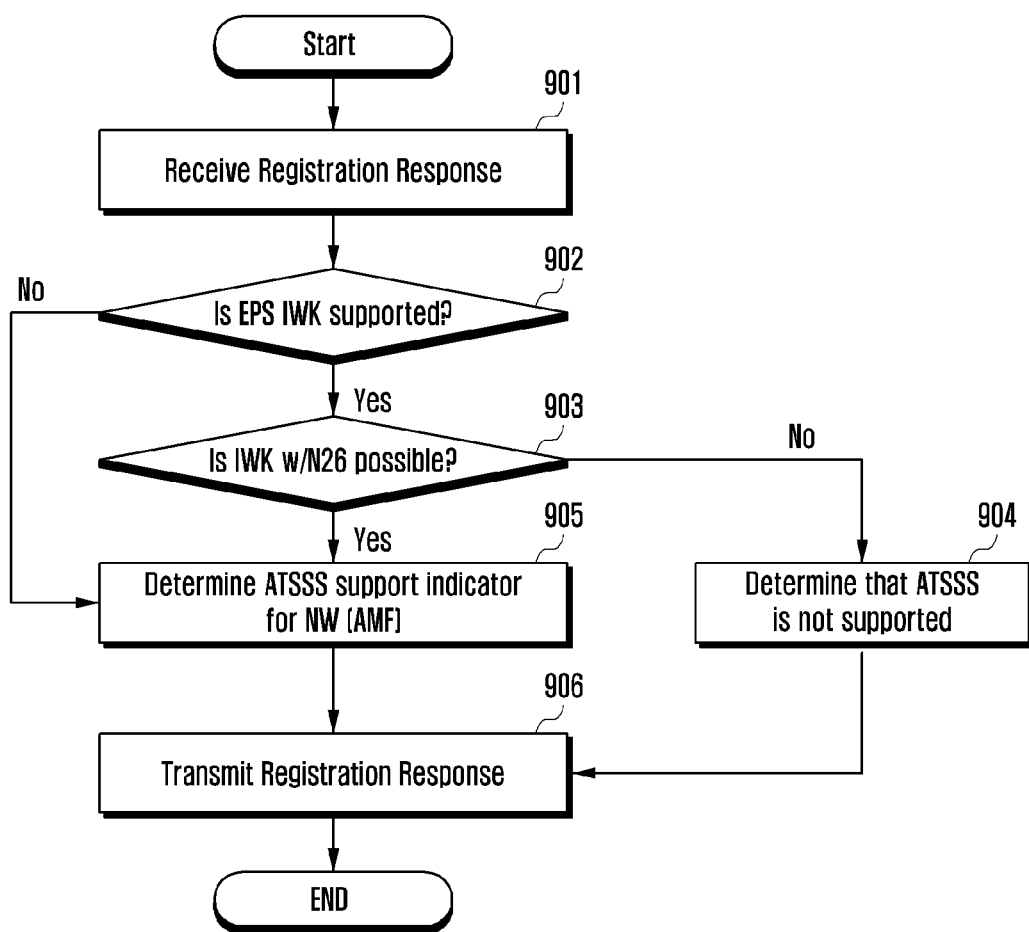
FIG. 9 is a view illustrating NF (AMF) operation of a network in another embodiment.

FIG. 9 is a view illustrating NF (AMF) operation of a network in another embodiment.

Step 901. The AMF may receive a registration request message for a specific terminal (subscriber). In the disclosure, it is assumed that the terminal supports the ATSSS function (that is, it includes the capability for ATSSS).

Step 902. The AMF may determine whether 4G network (EPS) interworking is supported for the corresponding terminal. This may be determined by considering whether the terminal has E-UTRAN support capability, whether the EPS interworking scheme is supported by the UE, whether EPS interworking is supported in NW, and whether EPS interworking is allowed depending on the subscription type. If EPS interworking is supported, the process may transition to step 903; otherwise, the process may transition to step 905.

Step 903. If EPS interworking support is required for the corresponding terminal, the EPS interworking method that can be supported by the NW may be determined. A method of interworking with an N26 interface (i.e., N26 interface between MME and AMF is supported) and a method of interworking without N26 interface (i.e., N26 interface not supported between MME and AMF) may be considered. If EPS interworking with N26 support is not possible, the process may transition to step 904.

Step 904. If EPS interworking with N26 is not supported for the UE, even if ATSSS is supported in the network and AMF, it may be determined that the terminal does not support ATSSS.

Step 905. The AMF may decide whether to support ATSSS of NW.

Step 906. The AMF may transmit a registration response to the terminal, including information about whether ATSSS is supported, in steps 904 and 905. If ATSSS is not supported, a separate ATSSS support indicator may not be included, or an explicit indicator that ATSSS is not supported may be included. On the other hand, NW (AMF) may decide whether to prioritize EPS interworking or ATSSS usage in the situation where EPS interworking and ATSSS cannot be applied simultaneously (i.e., ATSSS is supported, but only EPS interworking without N26 is supported). At this time, the AMF may consider the usage type of the terminal (i.e., whether it is voice-centric or data-centric), and in the case of a voice-centric type, EPS interworking may be given priority, and in the case of a data-centric type, the use of ATSSS may be considered first. Alternatively, the AMF may determine what is supported based on the operator's configuration or a separate operator's configuration. If priority is given to the use of EPS interworking, AMF may indicate, in the registration response sent to the terminal, that EPS interworking without N26 is supported, and may indicate that ATSSS is not supported. Conversely, if ATSSS is used first, ATSSS may be indicated to be supported and EPS interworking may be indicated not to be supported in the registration response.

Meanwhile, when determining whether an IMS-based voice service is supported for a terminal, the NW (AMF) may consider both the capability of the terminal and the configuration of the NW. If, in the configuration of NW, it is impossible to provide IMS voice service through the currently connected wireless network, EPS interworking with an N26 interface is not supported, and EPS interworking without an N26 interface is supported, if the terminal provides Handover Attach to 5GMM Information in the registration request message as "not supported", the response indicating support of IMS voice over PS session over 3GPP access among 5GS network feature support in the registration response message sent to the terminal may be "not supported". When the terminal that receives the registration response from NW has a usage type of voice-centric and receives an IMS Voice over PS session as "not supported", the terminal may attempt to first access another wireless network (4G or 3G) to receive a voice service.

Figure 10:
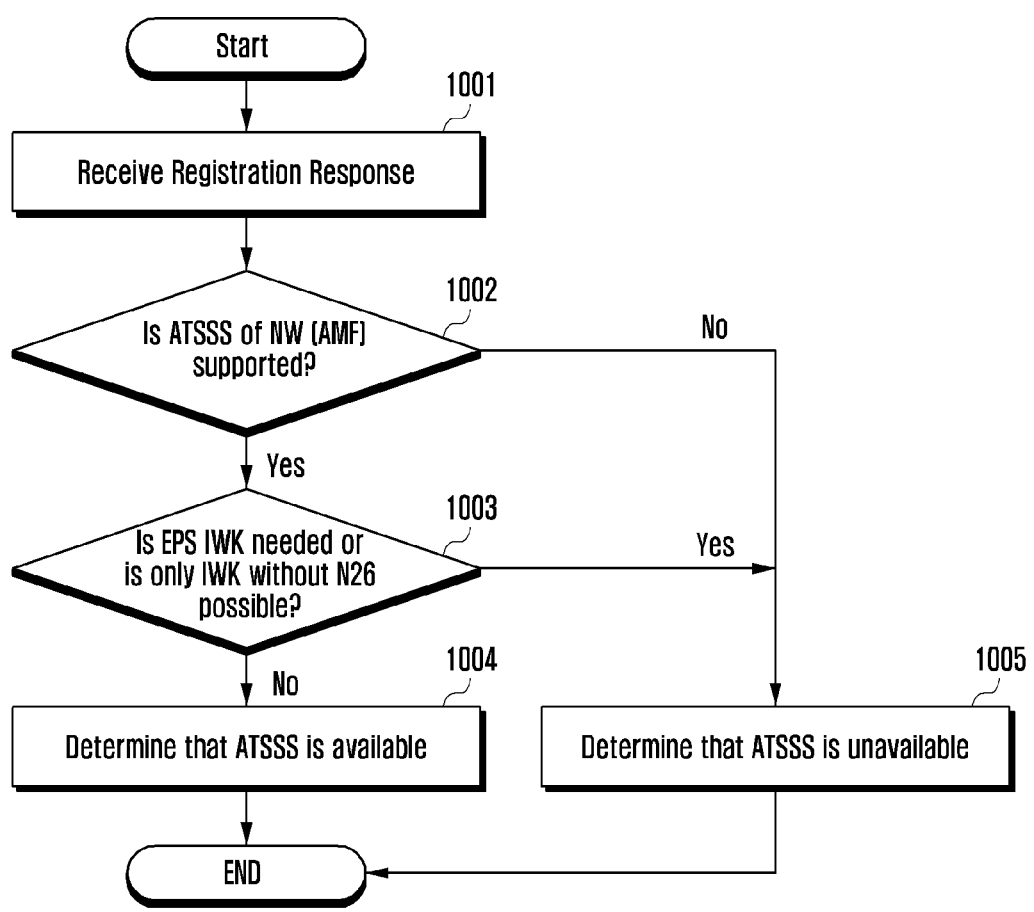
FIG. 10 is a view illustrating the operation of a terminal supporting ATSSS in another embodiment.

FIG. 10 is a view illustrating the operation of a terminal supporting ATSSS in another embodiment.

Step 1001. The terminal may receive a registration response message from the AMF.

Step 1002. The terminal may determine whether NW supports ATSSS through a response message received from the AMF. If the NW supports ATSSS, it may transition to step 1003, otherwise, it may transition to step 1005.

Step 1003. If the NW supports ATSSS, the terminal may determine whether EPS interworking is required and what the interworking support method is. To this end, whether the terminal has E-UTRAN support capability, whether NW supports EPS interworking, and whether the methods supported by the NW are capable of interworking with the N26 interface (i.e., whether the N26 Interface between MME and AMF is supported) and interworking without the N26 interface (i.e., use of the N26 interface between MME and AMF is not supported) may be considered. If EPS interworking needs to be applied to the terminal, but only EPS interworking without N26 is supported in NW, the process may transition to step 1005; otherwise, it may transition to step 1004.

Step 1004. If the terminal does not require EPS interworking or does not support EPS access, or if NW supports EPS interworking with N26, the terminal may determine that ATSSS can be used. Thereafter, the terminal may perform the operation of the ATSSS (a request for adding, or modifying the MA PDU Session).

Step 1005. If only interworking without N26 is supported, the terminal may determine that ATSSS cannot be used even if NW announces ATSSS support. Thereafter, the terminal might not perform the operation of the ATSSS (request for adding, modifying, etc. the MA PDU Session).

On the other hand, in the situation in which the terminal cannot use EPS interworking and ATSSS at the same time (that is, when ATSSS is supported but accesses a network that supports only EPS interworking without N26), the terminal may decide whether to prioritize EPS interworking or to prioritize the usage of ATSSS. This may be determined in consideration of the usage type of the terminal (i.e., whether it is voice-centric or data-centric), or may be determined through a local configuration of the terminal or a separate user configuration (such as input through a user interface). The terminal may consider EPS interworking as the priority for a voice-centric type and may consider ATSSS as the priority for a data-centric type.

Meanwhile, when determining whether to use the NW and IMS-based voice services, the terminal may consider the capability of the terminal and the configuration of the NW together. If the terminal receives the support of IMS voice over PS session over 3GPP access as "supported" through the 5GS network feature support among the registration responses and the interworking without N26 interface support as "supported" among the EPS interworking support methods from NW, but the terminal does not support the Attach with Handover (HO Attach) function, the terminal may determine that it is impossible to use an IMS-based voice service in a 5G network. In this case, if the service is voice-centric, the terminal may attempt to first access another wireless network (4G or 3G) for receiving a voice service.

Figure 11:
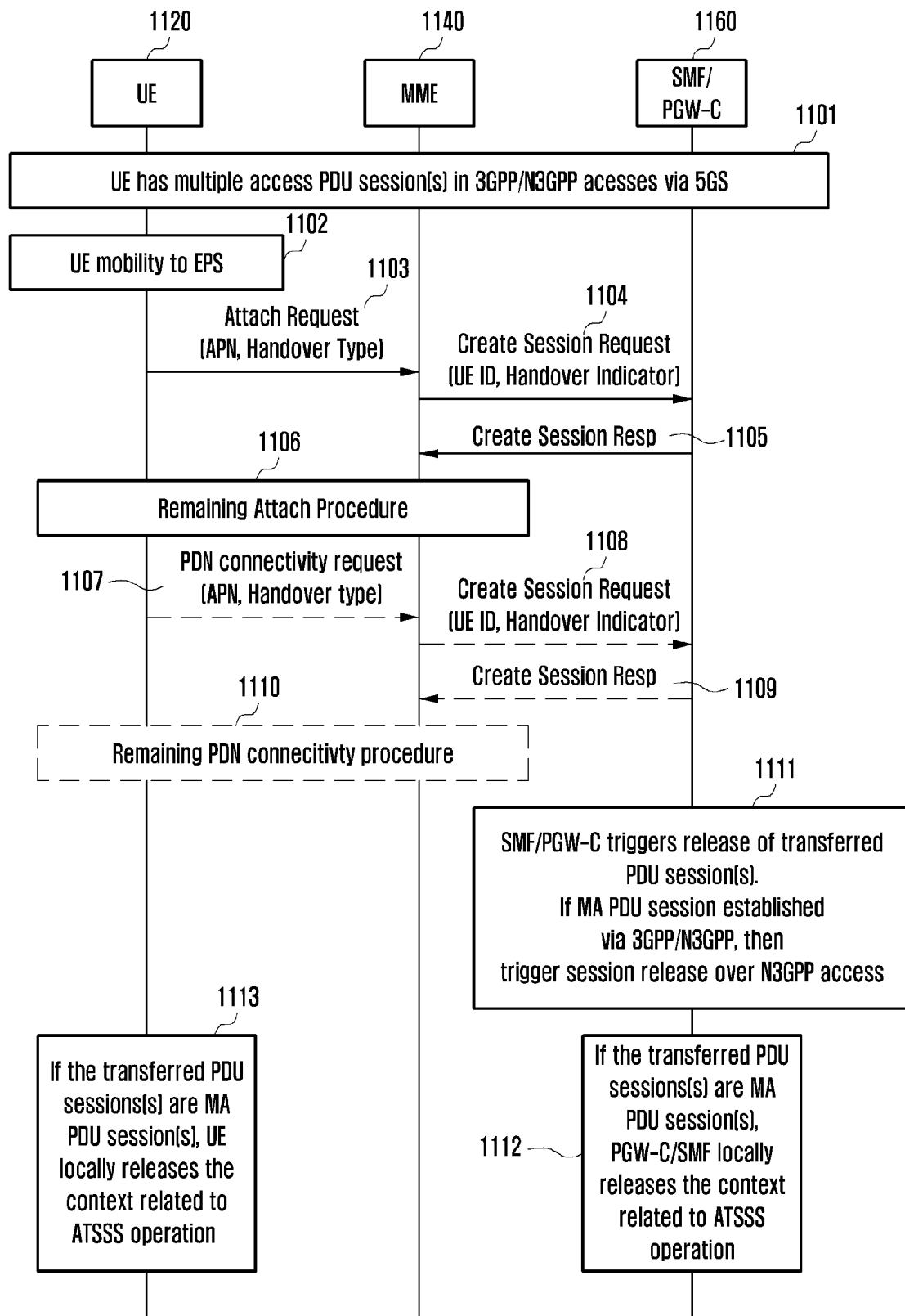
FIG. 11 is a view illustrating an operation of continuously providing service by processing a session when moving between a 5G network (5GS) and a 4G network (EPS) according to another embodiment.

FIG. 11 is a view illustrating an operation of continuously providing a service by processing a session when moving between a 5G network (5GS) and a 4G network (EPS) according to another embodiment.

Step 1101. The terminal 1120 may be registered in 5GS and receive a service by creating an MA PDU session through both 3GPP and N3GPP wireless networks.

Step 1102. The terminal 1120 may decide to transition to the 4G network (EPS) for reasons such as mobility, radio conditions, service characteristics, and network commands.

Step 1103. The terminal 1120 may perform an operation for attaching to the 4G network. The terminal 1120 may transmit an Attach request message to the MME of the 4G network. At this time, the request message may include an Attach or a request type of the PDN connectivity request included in the Attach, and the request type may be Handover. In addition, the information (APN) of a session in which the terminal continuously receives service by moving from 5GS to EPS during the Attach process may be included. Specifically, the terminal may additionally include the identifier of the session used in 5GS in the PCO inserted in the Attach request message.

Step 1104. The MME 1140 may select the PGW-C+SMF 1160 using PGW information (more specifically, PGW-C+SMF) among the subscription information received from the APN and HSS/UDM received from the UE, and may send a Create Session request message for session creation. The message may include an ID of the terminal (subscriber) indicating that the type of session creation is Handover. In addition, RAT type information indicating that the wireless network currently being accessed by the terminal is 3GPP (or 4G LTE) may be included. In this process, the process of transmitting the message by the SGW between the MME and the PGW-C+SMF is omitted.

The PGW-C+SMF 1160 may process the received session creation request.

Step 1105. The PGW-C+SMF 1160 may send a response to the session creation request.

Step 1106. The rest of the Attach process may be performed.

Step 1107. If an additional PDU session remains in addition to the PDU session that the terminal handed over to the EPS during the attach process, the terminal 1120 may perform a process for handing over the session to the EPS for the remaining sessions. More specifically, the terminal 1120 may send a PDN connection generation request to the MME 1140, include session information (APN) to receive the service without interruption by moving from 5GS to EPS, and include a handover of the type of the request being generated. In addition, the terminal may additionally include the identifier of the session used in 5GS in the PCO inserted in the request message.

Step 1108. The MME 1140 may select PGW-C+SMF 1160 using PGW information (more specifically, PGW-C+SMF) among the subscription information received from the APN and HSS/UDM received from the UE, and may send a Create Session request message for session creation. The message may include an ID of the terminal (subscriber) indicating that the type of session creation is Handover. In addition, RAT type information indicating that the wireless network currently being accessed by the terminal is 3GPP (or 4G LTE) may be included. In the process, the process of transmitting the message by the SGW between the MME 1140 and the PGW-C+SMF 1160 is omitted.

The PGW-C+SMF 1160 may process the received session creation request

Step 1109. The PGW-C+SMF 1160 may send a response to the session creation request.

Step 1110. The rest of the PDN Connection creation process can be performed.

Steps 1111 to 1112. For sessions transitioned from 5GS to EPS in steps 1101 to 1106 or steps 1107 to 1110, the PGW-C+SMF 1160 may start an operation for releasing relevant session information in 5GS. During this process, if the session transitioned to EPS is an MA PDU Session and the session is established for both 3GPP access and Non-3GPP access, the PGW-C+SMF 1160 may perform the session release procedure for Non-3GPP access.

Step 1113. For the PDN connection moved from 5GS to EPS (Session moved to EPS through the above Attach procedure or additional PDN connection establishment procedure), the terminal 1120 may delete stored ATSSS-related information, that is, a policy or rule for ATSSS, assistance information for measurement, etc. from internal information (terminal Context for PDN Connection). Similarly, the SMF may also delete the stored ATSSS-related information, that is, policies or rules for ATSSS, and assistance information for measurement, from the internal information (SM Context or PGW Context) for the PDN connection moved from 5GS to EPS.

In the above embodiment, each step may be performed by changing the order thereof, or may be performed in parallel. For example, if the terminal generates two PDU sessions in a 5G network and then transitions to EPS, during the attach process, the terminal may transition to first session and perform steps 1111 to 1113, and may transition to the second PDU session and perform steps 1111 to 1113.

It should be noted that the configuration diagrams illustrated in FIGS. 1 to 11, example diagrams of a control/data signal transmission method, operation procedure example diagrams, and other configuration diagrams are not intended to limit the scope of the disclosure. That is, all components, entities, or steps of operation described in FIGS. 1 to 11 should not be interpreted as essential components for implementation of the disclosure, and the inclusion of only some of the components can be implemented without departing from the scope of the disclosure.

The above-described operations of the base station or the terminal can be realized by providing the memory device storing the corresponding program code in any component in the base station or the terminal device. That is, the controller of the base station or the terminal device may execute the above-described operations through reading and executing the program code stored in the memory device by a processor or a central processing unit (CPU).

The entity, various components, modules, etc. of base station, or a terminal device described herein may be operated using hardware circuits, such as complementary-metal-oxide-semiconductor-based logic circuits, hardware circuits such as firmware and software and/or hardware and combinations of firmware and/or software embedded in machine-readable media. For example, various electrical structures and methods may be implemented using transistors, logic gates, and electrical circuits, such as custom semiconductors.

In the detailed description of the disclosure, specific embodiments have been described, but various modifications are possible without departing from the scope of the disclosure. Therefore, the scope of the disclosure should not be construed as being limited to the described embodiments, but should be determined not only by the scope of the claims described below, but also by the scope of equivalents of the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   establishing a multiple-access protocol data unit (MA PDU) session by a first access network and a second access network in a $5^{th}$-generation system (5GS);
   performing a handover the MA PDU session associated with the terminal from the 5GS to an evolved packet system (EPS) without an N26 interface between the 5GS and the EPS after the establishing the MA PDU session;
   transmitting, to a network entity in the EPS, a request message; and
   releasing a context related to a stored access traffic steering, switching and splitting (ATSSS) based on information on a release of the MA PDU session over the second access network,
   wherein the release of the MA PDU session over the second access network is triggered by the network entity,
   wherein the first access network is a 3rd generation partnership project (3GPP) access network, and
   wherein the second access network is a non-3rd generation partnership project (N3GPP) access network.

2. The method of claim 1,
   wherein the request message includes a request type and session information.

3. The method of claim 2, wherein the request type is an indicator related to a handover.

4. The method of claim 2, wherein the transmitting the request message comprises:
   transmitting a plurality of request messages according to a plurality of session identifiers, and
   wherein a plurality of session information, including the session information, includes the plurality of session identifiers.

5. The method of claim 1, wherein the EPS does not support the MA PDU session via the 3GPP access network.

6. A method performed by a network entity in an evolved packet system (EPS) in a wireless communication system, the method comprising:
   receiving, from a terminal, a request message after establishing a multiple-access protocol data unit (MA PDU) session, wherein the MA PDU session associated with the terminal is handed over from a $5^{th}$-generation system (5GS) to the EPS without an N26 interface between the 5GS and the EPS; and
   triggering a release of the MA PDU session over a second access network based on a request type and session information of the received request message; and
   wherein the MA PDU session is established by a first access network and the second access network in the 5GS,
   wherein a context related to a stored access traffic steering, switching and splitting (ATSSS) is released based on information on the release of the MA PDU session,
   wherein the first access network is a 3rd generation partnership project (3GPP) access network, and
   wherein the second access network is a non-3rd generation partnership project (N3GPP) access network.

7. The method of claim 6,
   wherein the request message includes the request type and the session information.

8. The method of claim 6, wherein the request type is an indicator related to a handover.

9. The method of claim 6, wherein the receiving the request message comprises:
   receiving a plurality of request messages according to a plurality of session identifiers, and
   wherein a plurality of session information, including the session information includes the plurality of session identifiers.

10. The method of claim 6, wherein the EPS does not support the MA PDU session via the 3GPP access network.

11. A terminal, comprising:
    a transceiver capable of transmitting and receiving at least one signal; and
    a controller coupled to the transceiver,
    wherein the controller is configured to:
       establish a multiple-access protocol data unit (MA PDU) session by a first access network and a second access network in a $5^{th}$-generation system (5GS),
       perform a handover the MA PDU session associated with the terminal is moved from the 5GS to an evolved packet system (EPS) without an N26 interface between the 5GS and the EPS after the establishing the MA PDU session,
       transmit, to a network entity in the EPS, a request message, and
       release a context related to a stored access traffic steering, switching and splitting (ATSSS) based on information on a release of the MA PDU session over the second access network,
    wherein the release of the MA PDU session over the second access network is triggered by the network entity,
    wherein the first access network is a 3rd generation partnership project (3GPP) access network, and
    wherein the second access network is a non-3rd generation partnership project (N3GPP) access network.

12. The terminal of claim 11,
    wherein the request message includes a request type and session information.

13. The terminal of claim 12, wherein the request type is an indicator related to a handover.

14. The terminal of claim 12, wherein the controller configured to transmit a plurality of request messages according to a plurality of session identifiers, and
    wherein a plurality of session information, including the session information includes the plurality of session identifiers.

15. The terminal of claim 11, wherein the EPS does not support the MA PDU session via the 3GPP access network.

16. A network entity in an evolved packet system (EPS), the network entity comprising:
    a transceiver capable of transmitting and receiving at least one signal; and
    a controller coupled to the transceiver,
    wherein the controller is configured to:
       receive, from a terminal, a request message, after establishing a multiple-access protocol data unit (MA PDU) session, wherein the MA PDU session associated with the terminal is handed over from a $5^{th}$-generation system (5GS) to the EPS without an N26 interface between the 5GS and the EPS,
       trigger a release of the MA PDU session over a second access network, based on a request type and session information of the received request message, and
    wherein the MA PDU session is established by a first access network and the second access network in the 5GS, wherein a context related to a stored access traffic steering, switching and splitting (ATSSS) is released based on information on the release of the MA PDU session,
wherein the first access network is a 3rd generation partnership project (3GPP) access network, and
wherein the second access network is a non-3rd generation partnership project (N3GPP) access network.

17. The network entity of claim 16,
wherein the request message includes the request type and the session information.

18. The network entity of claim 16, wherein the request type is an indicator related to a handover.

19. The network entity of claim 16, wherein the controller configured to transmit a plurality of request messages according to a plurality of session identifiers, and
wherein a plurality of session information, including the session information includes the plurality of session identifiers.

20. The network entity of claim 16, wherein the EPS does not support the MA PDU session via the 3GPP access network.

\* \* \* \* \*